(No Model.)
J. F. TAIT.
DRAFT EQUALIZER.
No. 355,036. Patented Dec. 28, 1886.
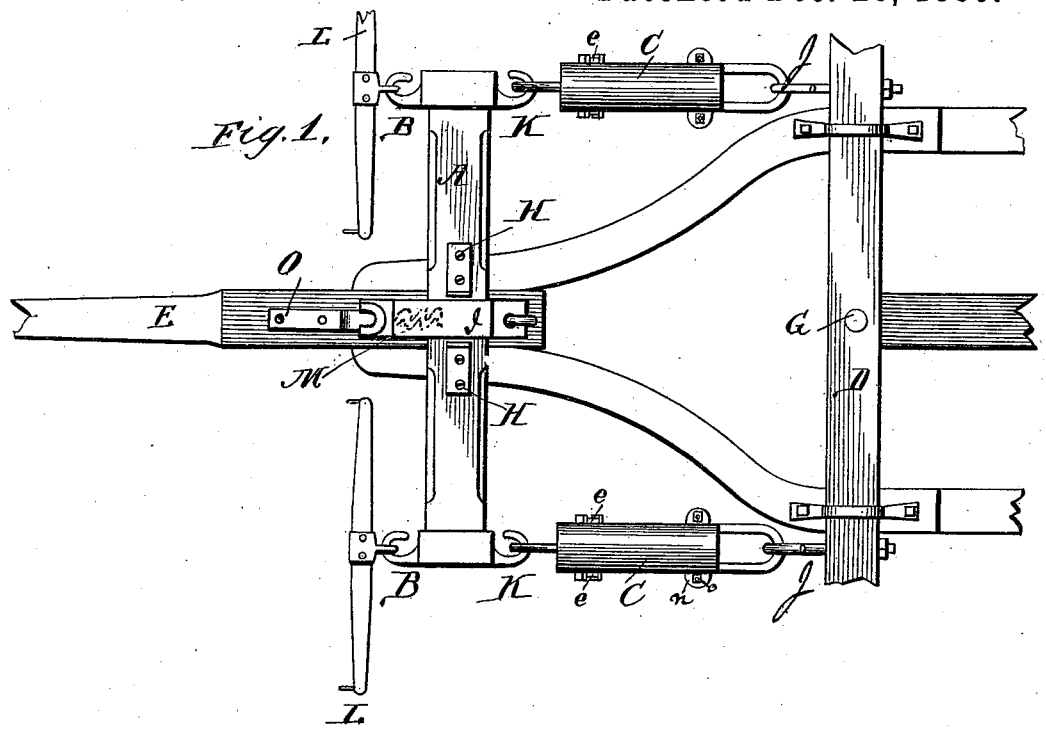
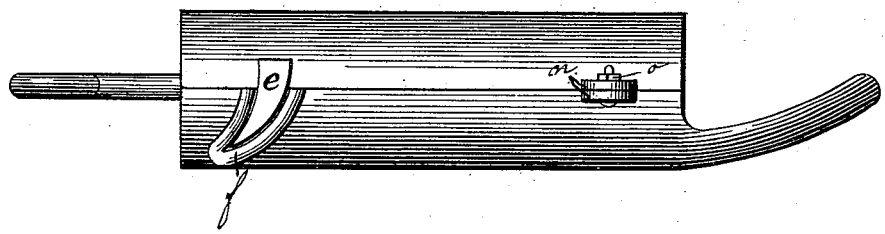
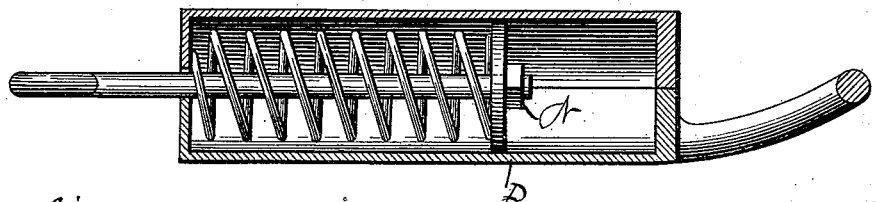
Witnesses.
W. Rossiter
J. I. Veeder
Inventor
James F. Tait
By Raymond & Ramey
Attys

UNITED STATES PATENT OFFICE.

JAMES F. TAIT, OF EVANSTON, ILLINOIS.

DRAFT-EQUALIZER.

SPECIFICATION forming part of Letters Patent No. 355,036, dated December 28, 1886.

Application filed August 2, 1886. Serial No. 209,775. (No model.)

*To all whom it may concern:*

Be it known that I, JAMES F. TAIT, of Evanston, in the county of Cook and State of Illinois, have invented certain new and useful Improvements in Draft Apparatus for Vehicles, of which the following is a sufficient specification.

My invention is applicable to vehicles drawn by two or more horses or other animals; and it consists in a new arrangement of draft mechanism and novel attachments therefor to a vehicle as a substitute for the ordinary evener, and effecting a better utilization of the energy of the draft-horses.

My invention will be fully understood from the following description, reference being had to the accompanying drawings, in which Figure 1 is a plan view of a portion of a vehicle with my apparatus attached. Fig. 2 is a detail drawing showing the spring C; and Fig. 3 is a section of Fig. 2.

D, Fig. 1, is the front axle of a vehicle pivoted on the king-bolt G. The tongue E is connected to the axle in the usual manner. The cross-bar or stretcher A takes the place of the ordinary evener, and, like the evener, maintains the whiffletrees in their proper position in relation to the vehicle and to each other. It differs from the evener, however, in being capable of movement back and forth in the space between the hammer-strap I and the tongue E. The stretcher is prevented from moving in the direction of its own length by the irons H H or other suitable means—as, for example, a pin inserted in it through a longitudinal slot in the hammer-strap I.

At each end of the stretcher A are castings or forgings provided with hooks B K. To the hooks B B are attached the whiffletrees L L. The rear hooks, K K, connect the stretcher A to the axle D through the springs C C and hooks J J. It is evident that the pull of the horses will be transmitted directly to the axle D.

The construction of the springs C C is plainly shown by Figs. 2 and 3. The spring C is inclosed in a casing made as shown in Figs. 2 and 3. The casing is made in halves, and the halves are connected by lugs *e f* and bolts *n o*. The lugs are so shaped that the halves of the casing cannot be separated except by separating the bolted ends first, and the thrust of the draw-spring upon the upper half is taken by these lugs. The tension of the spring may be regulated by the nut N. It is to be understood that the form or kind of spring used to connect the hooks J K J K may be varied without departing from my invention.

The operation of my apparatus may be thus summarized: The function of the common evener (namely, the distribution of the draft-load between the horses) is in large measure performed by the front axle, D, the king-bolt G acting as the fulcrum for this purpose. The vibration of the tongue, which is usually excessive and harassing to the animals when hauling heavy loads over rough roads, is by the action of the springs C C so checked that it does not fret or chafe the horses, and their work is thus accomplished with less fatigue and liability to injury.

The result above mentioned may be attained in a sufficient degree if, in addition to the springs C C, a third spring, M, be placed in front of the stretcher A, as shown in Fig. 1 in dotted lines. The spring M takes a portion of the draft, but the springs C C must retain enough of the load to enable them to perform their function of checking the vibration of the tongue.

It is not essential that the springs C C be placed directly back of the point of connection of the whiffletrees, for they may be placed nearer the tongue.

I construct the hammer-strap I to be attached to the tongue by a hook or hinge attachment at one end and by a removable bolt at the other, and for said removable bolt I use the wagon-wrench, using a strap, O, to keep the hammer-strap from vertical displacement.

I am aware that the ends of pivotal equalizers have been connected with each other by springs and ropes or chains, and whiffletrees have been also so connected with each other; but I am not aware that independent elastic connections have been heretofore made between the whiffletrees and the respective ends of the axle, as in my present invention.

I am also aware that draw-springs have been heretofore used both at the rear end of the pole or draw-bar and also behind the point of connection between the equalizer and the pole or draw-bar, so as to cushion the pull upon the tongue, and my present invention differs therefrom in that I have combined such a cushion with a stretcher, as hereinabove described.

I claim—

1. In a draft mechanism, a stretcher having at its longitudinal center a loose attachment to the tongue or pole, and having near its ends separate and independent spring attachments to the respective ends of the front axle of the vehicle, substantially as shown and described.

2. In a spring-draft mechanism, the spring box or casing P, the parts thereof being attached at one end in any convenient manner and having at the other end the lugs e f, constructed substantially as shown and described.

3. The combination, with the stretcher A, constructed substantially as described, of the removable hammer-strap I, the spring M, and the check-plates H H, all combined and arranged substantially as shown and described.

JAMES F. TAIT.

Witnesses:
　P. H. T. MASON,
　J. I. VEEDER.